May 30, 1967 E. R. SOLYST 3,323,116

ELECTROMAGNETIC TRANSDUCER AND METHOD OF FABRICATION

Filed May 31, 1962 2 Sheets-Sheet 1

INVENTOR.
ERIK R. SOLYST

BY

Carl Fissell Jr.

AGENT

ELECTROMAGNETIC TRANSDUCER AND METHOD OF FABRICATION

Filed May 31, 1962

2 Sheets-Sheet 2

INVENTOR.
ERIK R. SOLYST

BY

Carl Fissell Jr.
AGENT

United States Patent Office 3,323,116

Patented May 30, 1967

3,323,116

ELECTROMAGNETIC TRANSDUCER AND METHOD OF FABRICATION

Erik R. Solyst, San Jose, Calif., assignor to Burroughs Corporation, Detroit, Mich., a corporation of Michigan Filed May 31, 1962, Ser. No. 200,601
14 Claims. (Cl. 340—174.1)

The present invention is a continuation-in-part of application, Ser. No. 58,515, filed Sept. 26, 1960, now abandoned, in the name of Erik R. Solyst, entitled "Electromagnetic Transducer and Method of Fabrication," assigned to the same assignee as the present invention.

This invention relates to electromagnetic transducers and to the method of fabrication, More particularly, however, it pertains to such transducers including resilient mounting apparatus for positioning them adjacent a rotatable drum, disc, tape or other record member having magnetizable recording material thereon. With still more particularity, the present invention has to do with a resiliently mounted multi-channel electromagnetic transducer positionable in air bearing or "flying" relationship with movable record media.

The use of magnetic drums, discs and tapes, etc. having a tolerable degree of surface imperfections e.g., runout, etc., for large scale computation apparatus, has created, among other things a need for a magnetic transducer which is capable of undulating with respect to the surface of the member with which it is associated during reading or recording. It is a necessity of such apparatus that the air gap between the recording-reproducing member and the record member be exceedingly small, in order to produce good signal resolution and low noise during reading and/or recording. In computational magnetic recording-reproducing apparatus, gimbal type mountings have been employed for suspending the head or heads relative to the record member. These devices have worked fairly well. However, the gimbal mounting is necessarily expensive, is rather complicated to build and accurately adjust, and requires relatively precisely manufactured bearings. Furthermore, where it is necessary to gang the heads in multi-channel arrays adjacent the recording media, the problem of insulating and spacing the myriad head lead wires into, through and around the bearing members for connection to other associated apparatus produces a difficult packing density problem. Additionally, such a mass of wires tends to "load" the gimbal mounting member excessively making it relatively sluggish in responding to surface variations of the record media. Finally, the need for thinner heads capable of being assembled at closer center to center spacing and with an even narrower air gap between the record media and the head than is presently employed, has been a serious problem. With known head construction and materials should the head contact the surface of the record member the material of the head would be "plowed" up on both sides of the scratch or contact area thereby destroying the close spacing between the head and the record member. Any additional contact between the disc and the damaged head, e.g., due to head bounce, would further seriously damage both the record member and the head.

The principal object of the invention therefore is to provide a resilient, relatively flexible mounting structure for positioning an electromagnetic transducer closely adjacent a recording medium without danger of damaging the transducer or the recording medium if accidental contact should occur therebetween.

Another object of the invention is to provide a novel method of fabricating electromagnetic transducers as articles of manufacture.

It is another obejct of the invention to provide transducer apparatus wherein the magnitude of the operating gap between the transducer and the record surface is measured in microinches.

Still another object of the present invention is to provide an electromagnetic transducer which is operative in an air bearing or "flying" relationship relative to a rapidly moving record surface with a minimum of clearance therebetween.

A further object of the invention is the provision of a simple relatively inexpensive mounting means which is particularly adapted for use with ganged transducers and which is capable of accurate adjustment so as to insure parallelism between the transducer assembly and the record medium while permitting the transducer to undulate in response to the irregularities or runout of the record medium.

Another object of the invention is to provide a transducer structure of material which is hard and brittle and easy to lap to an extremely smooth surface finish.

Still another object of the invention is to provide a transducer structure of material which is dimensionally stable and has a relatively low coefficient of friction.

In accordance with the foregoing objects and first briefly described herein, the present invention comprises a flexible resilient mounting means for positioning a multi-channel magnetic transducer adjacent a record member in a manner permitting the transducer to undulate or rock and roll with the record member including means providing accurate adjustment of the air gap spacing between the head and the record medium under precise tension.

For a better understanding of the present invention together with other and further objects thereof, reference is had to the following description, taken in conjunction with the accompanying drawings wherein.

Figure 1:
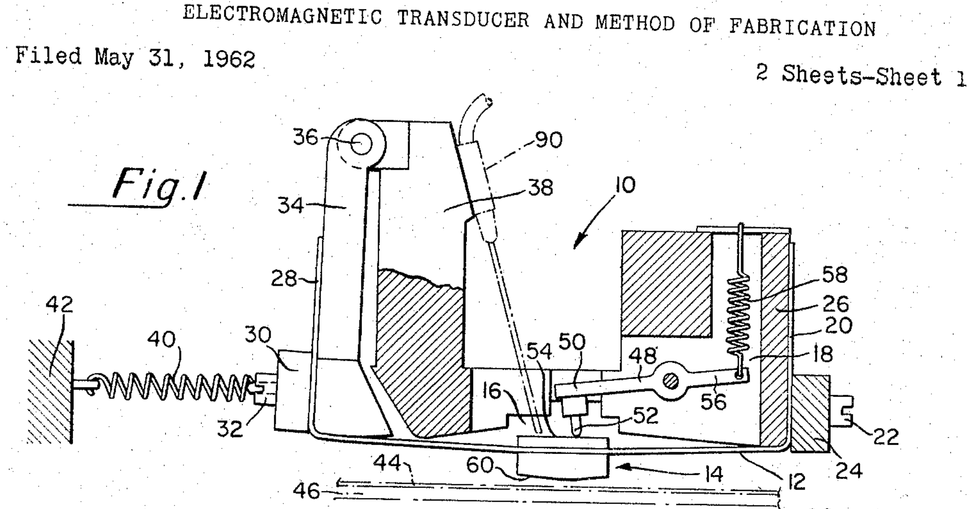
FIG. 1 is an elevational view with parts broken away of the preferred embodiment of the present invention.
Figures 2, 3, 4, 5:
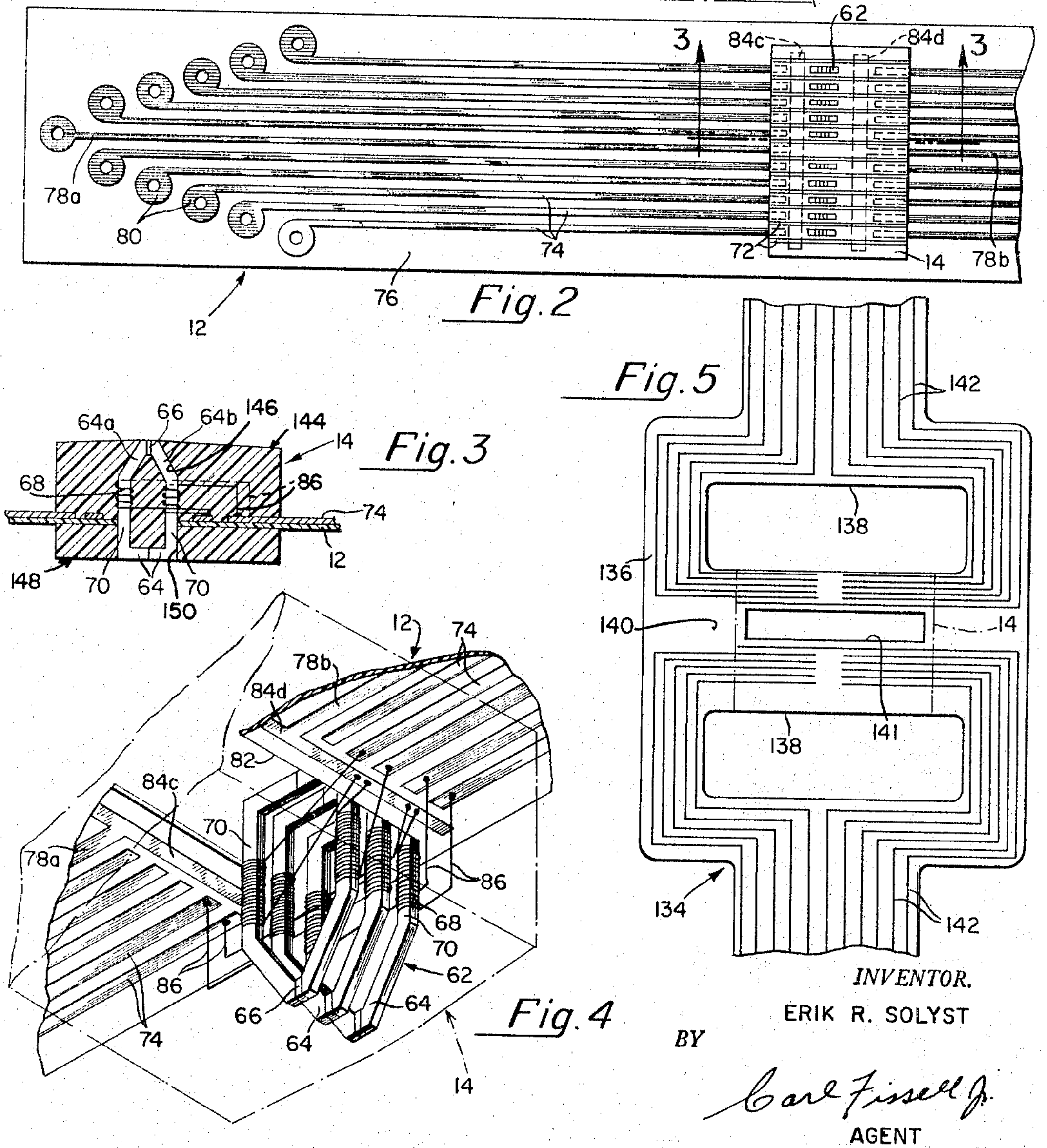
FIG. 2 is a plan view of a portion of the apparatus shown in FIG. 1 illustrating the transducer assembly and the interconnecting etched wiring busses of the flexible suspension member.
FIG. 3 is a section view along the line 3—3 of FIG. 2 illustrating one of the transducer heads with its electrical connection to the busses of the suspension member.
FIG. 4 is an isometric view partially in phantom of a portion of the head assembly of FIG. 1.
FIG. 5 is a plan view of a portion of a modified suspension member for use in the present invention.

Referring to FIGS. 1 and 2, an electromagnetic transducer head mounting and supporting apparatus embodying the present invention, is seen to comprise an assembly 10, including a relatively flexible suspension or flexure member 12 which may be made of dielectric plastic or other similar material such as Teflon or nylon or relatively thin metal having suitable resilience, flexibility and resistance to deformation from bending, etc.

An electromagnetic transducer 14 is secured to the member 12 in a manner and by means to be described in detail hereinafter. The flexible member 12 carrying the transducer 14 is suspended adjacent dished out areas or depression 16 of a relatively rigid supporting frame 18 by being secured at one end 20 by a bolt 22, passing through a block 24 and through the flexure 12 into the side 26 of frame 18. The opposite end 28 of the flexure 12 is secured by means of the block 30 and eye bolt 32 to a movable arm 34 pivoted at 36 to the side 38 of the frame 18. A tension spring 40 attached at one end to a rigid member 42 and at its other end to the eye bolt 32 on the member 30 biases the arm 34 arcuately clockwise thereby to maintain the flexure 12 in a taut condition.

The transducer 14 may be biased toward the surface 44 of a record medium 46 by a loading arm 48 one end 50 of which carries a stud 52 engageable with the upper surface 54 of the transducer 14. The opposite end 56 of arm 48 carries one end of a spring 58 which is attached at its other end to the frame 18 thus to bias the arm 48 counterclockwise, FIG. 1, causing the transducer 14 with its lower angular surface 60 to be moved thereby toward the surface 44 of the member 46.

In the preferred and illustrated embodiment of the invention the multi-channel transducer or recording-reproducing assembly 14 includes a plurality of individual heads 62, FIG. 2, each including a pair of substantially C-shaped ferrite core members 64—64, FIGS. 3 and 4, disposed in confronting relation so as to provide a narrow operating air gap therebetween. A shim 66 of silver or other similar non-magnetic material provides a separator on the order of .0005″ thick for the head gap. Energizable electrically conductive coils 68 are wound on the intermediate legs 70 of each of the cores 64—64 and may constitute multiple turns of insulated copper wire. The insulation on the wire serves to insulate the windings from the core elements.

The pairs of cores 64—64 constituting the individual heads 62 are ganged together, FIGS. 2 and 4, being suitably disposed in spaced apart side by side relation, FIG. 2, in a manner and by means to be explained herein later on. Preferably, a thin rectangular shield 72 of Mu metal, FIG. 2, or the like, is positioned between each head 62 thus to magnetically isolate each transducer from its neighbors.

Electrically conductive busses 74, FIG. 2 which may be formed on the member 12 as by etching away portions of a previously applied conductive metal overlay, are provided on one surface 76 of the member 12. The number of busses 74 is a matter of choice depending for the most part on the number of connections and/or interconnections to be made thereto from associated apparatus. In the preferred and illustrated embodiment of the invention eleven busses 74 are shown. The central busses 78*a* and 78*b* form electrical common conductors for purposes of convenience. A total of twenty busses is thereby provided on opposite sides of the same surface of the transducer assembly. In order to increase the packing density of the conductor array the busses are disposed on the dielectric member 12 in spaced apart parallel arrangement, with each buss terminating at one end in a pad 80 of circular configuration. The pads 80 at each end of the member 12 are arranged in a triangular grouping thus to facilitate the closer center to center spacing and simplify the interconnection thereto of other associated equipment. The busses 74 are of suitable thickness as to permit each to bend or flex throughout its length with the bending of the base material 12 while still providing sufficient cross sectional area to permit their use with current and/or voltage levels normally encountered in such recording-reproducing equipment.

As seen in FIG. 4, the member 12 may be provided with an opening or aperture 82 intermediate its ends, for purposes to be explained presently. The busses 74 terminate in a line adjacent the opening 82 with the common busses 78*a* and 78*b* terminating in transversely disposed conductors 84*c* and 84*d* paralleling the opposite longer sides of the opening 82 and spaced slightly inwardly therefrom.

As seen most clearly in the isometric view of FIG. 4 the lead wires 86 from the windings 68 of the heads are attached to alternate pairs of parallel busses 74 on the flexible suspension member 12 thus permitting the heads to be stacked in closely spaced apart parallel relationship and providing an exceptionally small overall assembly. It is to be understood of course, that the present invention may be utilized with other than disc type recording members, e.g., drums, tapes, etc., and the mounting means may remain substantially as shown in FIG. 1. As is described and claimed in the copending application in the name of Edward M. Johnson, Ser. No. 50,705, entitled "Electromagnetic Transducer Supporting Assembly," filed Aug. 19, 1960, now Patent No. 3,148,248 and assigned to the same assignee as the present invention, the transducer 14 is adapted to be initially located adjacent the recording media by means of compressed air. Air from a source not shown, is directed by means of a tube assembly 90 positioned adjacent the upper surface 54, into and through an orifice not shown in the transducer to impinge upon the disc surface 44 creating a thin film of air between the disc 46 and the transducer 14 causing it to float thereon.

Figure 6:
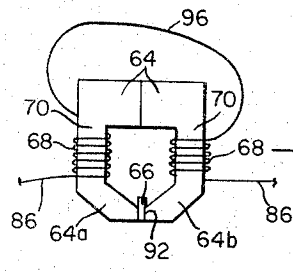
FIG. 6 is an enlarged detail view of a recorder-reproducer head according to the present invention.

The method of fabrication of the transducer supporting assembly will now be described with particular reference to FIGS. 6 through 12, inclusive. As before described and as seen in FIG. 6, each pair of ferrite members 64—64 includes two inwardly angled confronting legs 64*a* and 64*b* one of which may be undercut slightly as indicated by reference character 92 to provide a step or space for the reception therein of the silver shim 66 earlier referred to herein. The turns of wire forming the coils 68—68 of each of the central, substantially parallel, leg portions 70 are applied thereto by means of a continuous core winder e.g., of the type described and claimed in the copending U.S. patent application entitled "Coil Winding Apparatus," Ser. No. 192,730, filed May 7, 1962 in the name of Howard P. White, now Patent No. 3,222,000 and assigned ot the same assignee as the present invention. In order to decrease the required number of solder joints a continuous loop 96 is formed interconnecting the two coils, the opposite ends 86—86 of which are left exposed for attachment to other associated equipment, as will be described hereinafter.

Figure 7:
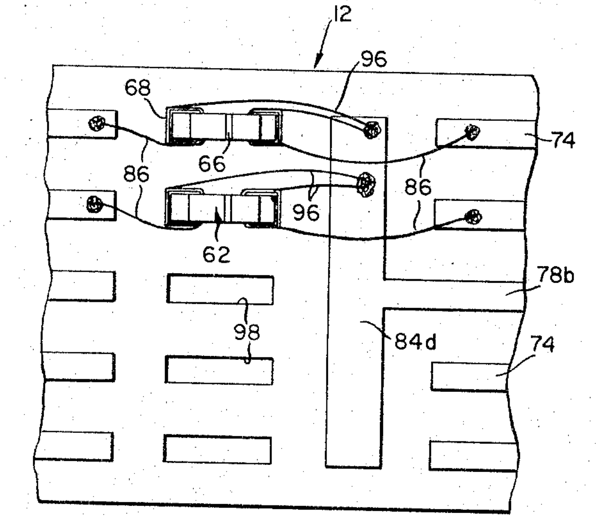
FIG. 7 is a top plan view of a portion of the flexible mounting means embodying the invention and showing two heads mounted thereon.

The flexure or suspension member 12 having, as beforementioned, the desired degree of flexibility and resilience may be provided with a pluarlity of rectangular openings 98, FIG. 7, or it may be provided with a single large rectangular opening therein as in FIGS. 1–5. For the purposes of the present description and in order to simplify the drawings, only five elongated rectangular openings 98 are shown in FIG. 7. The heads 62 are suitably disposed within the rectangular openings as by being press-fitted therein and thereafter the head assembly now carried by the flexure 12 is placed in a jig 100, FIG. 8. The opposite sides 102 of the jig are angularly canted away from the apex thereof to provide oppositely disposed flat surface portions against which the flat under surface of the ends of the flexure 12 may rest. The respective ends 86—86 of the coils 68—68 are then attached, as by welding, to respective ones of the conductive busses 74 earlier referred to. The common winding 96 from the cores is spot welded to the common bus 84*d*.

A mold 104 is next provided having oppositely disposed half portions 106 and 108 and an access opening 110 for the ingress of molding material such as dielectric epoxy resin. The lower portion 108 includes a substantially rectangular chamber 112 while the upper portion includes a similar chamber 112′ which has a series of rectangular apertures 114 therein for receiving the active ends of the ferrite heads 62.

Figure 9:
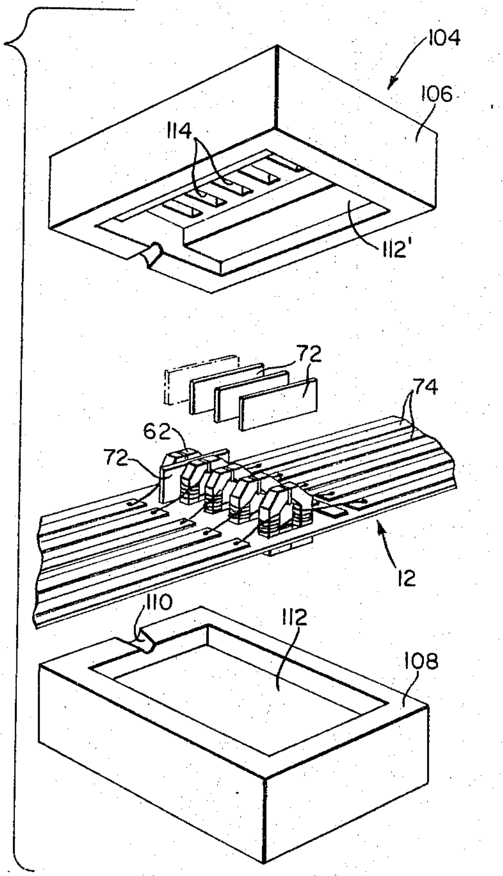
FIG. 9 is an exploded isometric view of the mold employed in the method of fabricating the device embodying the invention.

The flexure suspension 12 carrying the heads 62 is placed in the mold with each head 62 disposed through a respective one of the openings 114 therein. Cross talk prevention means 72 of Mu metal or similar material is press-fitted between the pairs of heads 62 as shown in FIG. 9. The two mold halves are then joined together over the flexure 12, FIG. 10, leaving the flexure ends freely extending away therefrom. Dielectric epoxy material 116 is poured through the access openings 110, FIG. 9, to spread around inside the mold and completely surround the flexure suspension 12 in the neighborhood of the heads 62 as shown, leaving a portion 118 of each head exposed and free of casting material.

In certain equipment it is desirable to have means for detecting any contact between the core members 62 or bearing surface and the recording media 46, whether it be a disc, a drum or a tape. To this end, a second half 120 is provided and substituted for the mold half 106, FIG. 11 and the transducer 14 is replaced in the mold and conductive epoxy resinous material is applied through the access opening 122 so as to surround the area 118 adjacent the active gap portion of the ferrite heads 62. Thereafter the flexure is removed from the mold and the active operating portion of the head area is ground and polished to prescribed surface tolerances.

Figure 12:
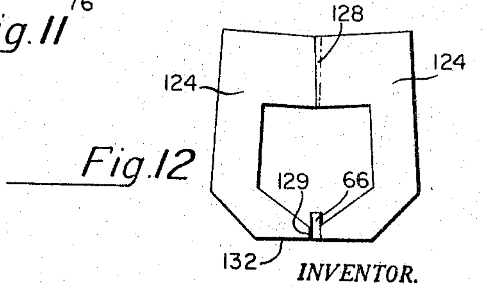
FIG. 12 is a view of a modified form of recorder-reproducer head construction.

In order to avoid a costly finish-machining (lapping) operation, as described in connection with the cores of FIG. 6, with the upper ends of cores 64—64 in confronting relation one of the two confronting portions or faces 124—124 may be cut or lapped at an angle 128, FIG. 12, so as to provide an oppositely disposed opening 129 when the cores are joined as shown within which the silver shim 66 may be easily and efficiently positioned. Thereafter the lower gap or operating portion 130 of the assembly is milled flat as indicated at 132 and highly polished to provide a suitable operating surface.

In the preferred embodiment of the present invention the transducer assembly 14, FIG. 2 may be fabricated from a material which is relatively hard and brittle and thus easy to lap to a good smooth surface finish and which is also dimensionally stable and has a low coefficient of friction. One such material fullfilling these requirements which is readily available is carbon(graphite). A relatively pure grade of carbon of low porosity is desirable in order to avoid any accumulation or pick-up of dirt or debris from the polishing or cleaning operation by the carbon material. Also the carbon preferably should be of a type and grade exhibiting low themal expansion thereby to prevent undesirable warpage during fabrication and/or use.

Of course, other materials having the same general physical characteristics as carbon could also be employed. Carbon is preferred over metals such as aluminum and brass since in machining a metal sharp edges and burrs may result which are difficult to avoid even with a lapping operation. If these sharp edges and burrs accidentally engage the magnetic record surface they tend to destroy or degenerate the quality of the magnetic coating. In contrast to this when carbon is machined it does not form sharp edges or burrs but merely flakes off and leaves a smooth surface thereby avoiding the aforementioned problems. In addition, carbon has a self-lubricating characteristic which results in an advantage if accidental contact with the record member should take place during operational use.

The employment of a carbonaceous material for the transducer supporting structure avoids the casting or molding steps previously referred to herein and results in a relatively simple and clean fabrication operation. The transducer 14 is as seen in FIGS. 1, 2 and 3 comprised of oppositely disposed confronting carbon shoes. As viewed in FIG. 3, which is a section along the line 3—3 of FIG. 2, the upper sectionalized area 144 enclosing the head gap may be characterized as the bearing shoe or plate and is seen in FIG. 2 to be provided with a plurality of elongated apertures or slots 146 therein for reception of the ferrite heads 62. The opposite or lower sectionalized area 148, FIG. 3, is characterized as the cover shoe or plate. The lower area or plate 148 is likewise provided with a plurality of elongated apertures or slots 150 for conjoint mating arrangement with the upper set of slots 146 in the area 144. The two shoes are bonded together wtih the flexible suspension member disposed therebetween as shown in FIGS. 1 and 3, with the electrical interconnection thereto arranged in the same manner as heretofore described. It is noted that the electrical conductive lead wires 86 are led back from the oppositely disposed C-shaped portions of the ferrite head for interconnection to the conductive busses 74 of the suspension. This may be accomplished by milling, drilling or otherwise channeling the carbon material to provide channels through which these conductors may be lead to their termination on the busses 74.

The bearing plate with its array of head gaps is cut and lapped at a desired angle with respect to the horizontal thereby to provide a crown height as seen most clearly in FIGS. 1 and 3, sufficient to permit the transducer to be moved away from the disc as the air is wedged therebetween and to fly or float on the hydrodynamic air bearing generated as a result of the rotation of the disc relative thereto, as hereinafter set forth.

With the carbon type construction aforedescribed which may be characterized as a self-lubricating transducer assembly, should physical contact occur accidentally between the transducer and the record member the damage to either the record member or transducer is greatly minimized.

In readying the transducer for operation, the suspension member 12 is attached at one end by means of the block 24 and bolt 22 to the support member 26, the opposite end being placed under suitable tension by means of the arm 34 hereinbefore described and maintained under suitable tension by means of the coiled spring 40 attached to the fixed support 42. Air under pressure is applied through the tube assembly 90 to be injected through an aperture, not shown, in the transducer 14 causing the latter to be forced away from the vicinity of the rotating disc 46 and to float on a hydrostatic film of air thus generated therebetween. The loading arm 48 and spring 58 places sufficient tension on the transducer 14 to cause it to be moved toward the disc. The disc is brought up to speed by driving means, not shown, whereupon an aerodynamic effect causes a hydrodynamic gas lubricated bearing or air cushion to form between the surface of the disc and the transducer as the air is drawn into the wedge shaped space therebetween. At this time with the disc up to speed, the air pressure through the assembly 90 is cut off. The hydrodynamic air cushion or bearing forces the transducer away from the disc in the direction of the loading arm against the tension of the spring. The transducer then floats or flys on the hydrodynamic bearing thus generated between the head and the disc.

Figure 8:
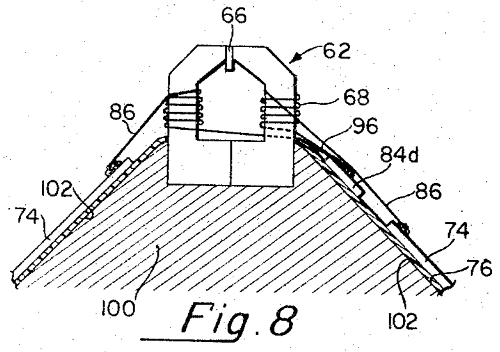
FIG. 8 is a sectional view of a fixture used in the fabrication of the transducer.
Figure 11:
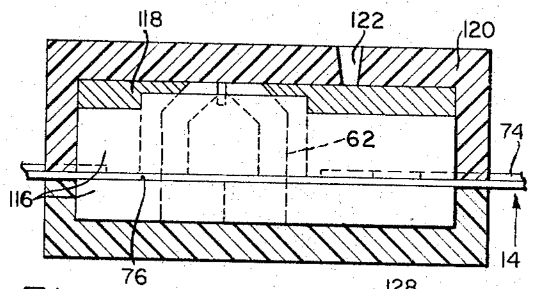
FIG. 11 is a sectional view of another mold employed in the method of fabricating the apparatus embodying the invention.
Figure 10:
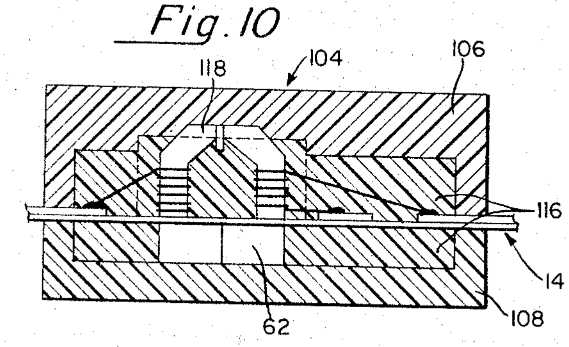
FIG. 10 is a sectional side view of the mold of FIG. 9 with a transducer illustrated therein.

In the plan view of FIG. 5 there is shown a modified head suspension structure 134 wherein a substantially rectangular portion 136 of the member 134 has been provided with a pair of oppositely disposed parallel rectangular cut outs or apertures 138 providing a central solid area 140 within which the core structures 62 may be mounted, as by being ganged together as in FIG. 4 and thereafter disposed in the jig of FIG. 8 and then press-fitted into the rectangular openings 141 in the flexure 134. The printed wiring busses 142 interconnecting the opposite legs of the recording-reproducing cores 62 may be brought out in oppositely disposed parallel arrays, as shown, to suitable connectors, not shown, for interconnection with associated computation apparatus with which the present device may be utilized. The suspension of FIG. 5 provides slightly more resilience than the suspension shown in FIG. 2, and permits the head to assume or partake of greater undulatory movements with respect to the recording surface and is thus usable with record media having a greater degree of surface aberrations.

It can be seen from the foregoing that the novel transducer construction hereinbefore described permits the transducer to undulate with the movement of the recording media and thus partake of any slight aberrational movement which may occur due to runout, for example, of the disc, or by the hills and hollows of the drum or other defects which may be included in the recording media. The flexible suspension is resilient enough to permit the transducer to follow such undulations without touching the surface of the record medium, while at the same time, maintaining the spacing between the disc and the transducer on the order of from 50 to 250 microinches. This novel arrangement avoids the high loading stresses and strains, involved with lead wires and cabling as required on prior art transducers, those for example, employing gimbal mountings. The present transducer is thus permitted additional degrees of freedom of movement unrestrained by lead wires, bearings, etc.

What is claimed is:

1. Electromagnetic transducer apparatus for use with a movable record medium having a magnetizable recording surface thereon comprising, a flexible pliant strip-like mounting member, of homogeneous material throughout its extent, an electromagnetic transducer assembly carried by said flexible strip-like member approximately midway between its ends, said transducer assembly including one or more read-record heads, means for energizing said read-record heads including one or more flexible electrical conductors carried by the strip-like member and capable of bending with the flexing movement of the member, and means mounting said flexible strip-like member at its opposite ends while leaving the balance of the member free and unsupported so that it can undulate therebetween permitting rock and roll movement of said transducer assembly when mounted closely adjacent to a record medium and in response to aberrations in the record medium.

2. Electromagnetic transducer apparatus for use with movable record media having a magnetizable recording surface thereon comprising, an elongated flexible pliant mounting member of homogeneous material throughout its extent having an aperture approximately centrally located therein, transducer apparatus including a plurality of electromagnetic recorder-reproducer members mounted in parallel spaced apart relationship on said flexible member with portions thereof extending through said aperture, electrically conductive means disposed on a surface of said mounting member and extending from adjacent an end thereof to the transducer apparatus, said conductive means being capable of bending with the flexing movement of the mounting member, each recorder-reproducer member including one or more operating windings thereon interconnected with said electrical conducting means on said flexible mounting member, and means mounting the opposite ends of said flexible mounting member while leaving the balance thereof free thereby permitting rock and roll movement of said transducer apparatus when mounted closely adjacent a record medium and in response to surface aberrations on the surface thereof.

3. Electromagnetic transducer apparatus for use with a movable record medium having a magnetizable recording surface thereon comprising, an elongated flexible pliant strip-like mounting member of homogeneous material throughout its extent, a rigid transducer assembly including a supporting block of hard, brittle dimensionally stable rigid material having a low coefficient of friction mounted on said flexible strip-like member approximately midway between its ends, said transducer assembly further including one or more read-record heads, enclosed within said rigid material, means for energizing said read-record heads including flexible electrically conductive busses formed on the strip-like member and connected to and extending from said heads to adjacent one of the ends of the member, and means mounting said flexible strip-like member solely at its opposite ends so that the midportion thereof is slung and can undulate therebetween permitting rock and roll movement of a transducer assembly when mounted closely adjacent said record medium and in response to any aberrations in the record medium.

4. Electromagnetic transducer apparatus for use with movable record media having a magnetizable recording surface thereon comprising, an elongated flexible mounting member of homogeneous material throughout its extent having an aperture therein approximately centrally located between its ends, a block of carbonaceous material disposed within said aperture, transducer apparatus including a plurality of electromagnetic recorder-reproducer members mounted in parallel spaced apart relationship within said block on said flexible member with portions of said reproducer members extending through said aperture, electrically conductive means disposed on a surface of said mounting member and extending from the transducer apparatus to at least one end of the member, each recorder-reproducer member including one or more operating windings thereon interconnected with said electrical conducting means on said flexible mounting member, means mounting said flexible mounting member solely at its opposite ends to spaced apart supports whereby the balance of the member is slung therebetween and provides a flexible suspension for the transducer apparatus, and means for varying the spacing of the supports in order to vary the tautness of the suspended portion of the member.

5. Electromagnetic transducer apparatus for use with movable record media having a magnetizable recording surface thereon comprising, a transducer supporting block formed of material characterized as being dimensionally stable, hard, brittle and having a low coefficient of friction material, a mounting member of flexible homogeneous material throughout its extent having an aperture therein intermediate its ends, transducer apparatus including a plurality of electromagnetic recorder-reproducer members disposed in said block in parallel spaced apart relationship with portions thereof extending through said aperture, means securing said transducer block within said aperture in said flexible mounting member, electrically conductive means adhering to said mounting member and extending from the transducer apparatus to at least one end of the mounting member, said conductive means being composed of flexible material capable of flexing with the movement of the mounting member, each recorder-reproducer member including one or more operating windings thereon interconnected with said electrical conducting means on said flexible mounting member, and means mounting the opposite ends of said flexible mounting member whereby the apertured portion thereof is freely suspended therebetween and the transducer apparatus carried thereby may be positioned closely adjacent the surface of a record medium so as to ride on a film of air on said surface generated by its movement and whereby said flexible member permits said transducer apparatus to rock and roll in response to aberrations in the surface of the record medium.

6. The method of fabricating electromagnetic transducer apparatus comprising the steps of, providing a flexible mounting member with a plurality of electrically conductive members thereon and including one or more apertures therethrough disposed in parallel spaced apart relationship, providing a plurality of recorder-reproducer members with electrically energizing windings thereon, inserting one of said recorder-reproducer members in each of said apertures, attaching the windings of said recorder-reproducer members to respective ones of said electrically conductive members on said flexible mounting member, molding a body of dielectric molding material around and about said recorder-reproducers to thereby rigidly secure the same to said flexible mounting member leaving a portion of the area adjacent the ends of the recorder-reproducer members exposed and free of molding material, molding around and about the last named area electrically conductive molding material, and, thereafter finish-machining said assembly thereby to provide a smooth surface portion for operation in air bearing relationship adjacent a record medium.

7. Transducing apparatus comprising, in combination, a movable record medium, a thin flexible pliant member of homogeneous material and elongated in one direction, an electrically energizable transducer carried by said flexible member approximately midway between its ends, electrical conductive means adhering to said flexible member and extending from at least one end thereof to the transducer and connected thereto for energizing the same, said conductive means being formed of material capable of bending with the flexing movement of the member, and means mounting said flexible member only at its opposite ends leaving the balance of the member unsupported and assuming a slung condition whereby the intermediate portion of the member can undulate thus permitting the transducer to partake of a slight up and down movement, said mounting being so disposed with respect to the record medium as to position the transducer close to one surface thereof in air bearing relationship therewith.

8. A transducer assembly comprising, in combination, a thin flexible member elongated in one direction, a rigid relatively hard, brittle, dimensionally stable body having a low coefficient of friction carried by said flexible member approximately midway between its ends, means mounting at least one electrically energizable transducer within said body, and electrical conductive means adhering to said flexible member and extending longitudinally from at least one end thereof to said transducer and connected thereto for energizing the same, said conductive means being composed of material capable of bending with the flexing movement of the member.

9. Electromagnetic transducing apparatus for use with movable record media having a magnetizable recording surface thereon comprising:

(a) a block of carbon graphite material, (b) a plurality of electromagnetic recorder-reproducer members embedded in said block in parallel spaced-apart relationship, (c) each of said members having a transducing gap therein and so disposed within the block that the gaps extend in alignment adjacent to one side of the block, (d) and means mounting said block with said side thereof in close proximity to the plane in which the recording surface of the record media is moved and providing self-adjustable movement relative to the surface in response to any aberrations therein.

10. Electromagnetic transducing apparatus comprising in combination, (a) a movable record medium having a magnetizable recording surface thereon, (b) a rigid transducer assembly composed of a block of carbon graphite material having embedded therein a plurality of electromagnetic transducer elements each having a transducing gap, (c) such elements being so embedded within the block that the gaps thereof are disposed adjacent to one side of the block and in substantial alignment with one another, (d) means mounting said block for rocking movement, (e) and means for bringing said block with said side thereof containing the gaps of the transducing elements into close proximity to the recording surface, (f) the carbon graphite material of the block providing a hard, brittle and dimensionally stable material having a low coefficient of friction and such that upon accidental physical contact with the recording surface little if any impairment of the latter occurs.

11. Electromagnetic transducer apparatus comprising:

(a) a rigid transducer assembly composed of a block of electrically conductive carbon-graphite material, and (b) one or more electrically non-conductive electromagnetic transducer elements each having a transducing gap embedded in the block such that the gaps of the transducers are disposed adjacent to one side of the block in substantial alignment with one another.

12. Electromagnetic transducing apparatus for use with movable record media having a magnetizable recording surface thereon comprising:

(a) a block of electrically conductive carbon-graphite material, (b) a plurality of electrically non-conductive ferrite electromagnetic recorder-reproducer members embedded in said block having a transducing gap therein and so disposed within the block that the gaps extend in alignment adjacent to one side of the block for positioning in close proximity to the plane in which the recording surface of the record media is moved.

13. Electromagnetic transducer apparatus for use with movable record media having magnetizable recording surfaces thereon and comprising, in combination, (a) a transducer supporting block composed of material characterized by being dimensionally stable, hard, brittle, and having a low coefficient of friction, and lapped to provide a high polished surface and capable of flaking off to retain a relatively smooth surface;

(b) and one or more electromagnetic transducer elements each having a transducing gap embedded in the block such that the gaps of the transducers are disposed in substantial alignment with one another and adjacent to said high polished surface of the block for positioning in close proximity to the plane in which the recording surface of a record medium is moved.

14. Electromagnetic transducer apparatus for use with movable record media having magnetizable recording surfaces thereon and comprising, in combination, (a) a transducer supporting block composed of a material granular in structure and characterized as being dimensionally stable, hard, brittle, and having a low coefficient of friction; and capable of baking off to retain a relatively smooth surface and being lapped to provide a high polished side;

(b) and one or more electromagnetic transducer elements each having a transducing gap embedded in the block such that the gaps of the transducers are disposed in substantial alignment with one another and adjacent to said polished side of the block for positioning in close proximity to the recording surface of a movable record medium.

References Cited

UNITED STATES PATENTS

| | | | |
|---|---|---|---|
| 2,863,004 | 12/1958 | Maclau et al. | 340—174.1 |
| 2,886,651 | 5/1959 | Vogel | 179—100.2 |
| 2,957,051 | 10/1960 | Epstein et al. | 179—100.2 |
| 2,965,721 | 12/1960 | Hollabaugh et al. | 179—100.2 |
| 3,051,954 | 8/1962 | Osterlund | 346—74 |
| 3,094,772 | 6/1963 | Duinker | 179—100.2 X |
| 3,187,313 | 6/1965 | Smith | 340—174.1 |
| 3,224,074 | 12/1965 | Peters | 29—155.5 |

BERNARD KONICK, *Primary Examiner.*

IRVING L. SRAGOW, M. K. KIRK, J. F. BREIMAYER, *Assistant Examiners.*